United States Patent
Treibitz et al.

(10) Patent No.: US 11,062,433 B2
(45) Date of Patent: Jul. 13, 2021

(54) TARGET-LESS CALIBRATION OF TURBID MEDIA

(71) Applicants: CARMEL HAIFA UNIVERSITY ECONOMIC CORPORATION LTD., Haifa (IL); TECHNION RESEARCH & DEVELOPMENT FOUNDATION LIMITED, Haifa (IL)

(72) Inventors: Tali Treibitz, Beer Yaakov (IL); Guy Gilboa, Kiryat Tivon (IL); Ori Spier, Kibutz Nahsholim (IL)

(73) Assignees: CARMEL HAIFA UNIVERSITY ECONOMIC CORPORATION LTD., Haifa (IL); TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 16/492,713

(22) PCT Filed: Mar. 13, 2018

(86) PCT No.: PCT/IL2018/050297
§ 371 (c)(1),
(2) Date: Sep. 10, 2019

(87) PCT Pub. No.: WO2018/167787
PCT Pub. Date: Sep. 20, 2018

(65) Prior Publication Data
US 2020/0226727 A1  Jul. 16, 2020

Related U.S. Application Data

(60) Provisional application No. 62/470,527, filed on Mar. 13, 2017.

(51) Int. Cl.
*G06T 5/00* (2006.01)
*G06T 5/50* (2006.01)
(Continued)

(52) U.S. Cl.
CPC ............... *G06T 5/009* (2013.01); *G06T 5/50* (2013.01); *G06T 7/90* (2017.01); *H04N 9/0451* (2018.08);
(Continued)

(58) Field of Classification Search
None
See application file for complete search history.

(56) References Cited

U.S. PATENT DOCUMENTS

| 3,604,803 | A  | * | 9/1971 | Kahn | G01S 17/18 356/5.04 |
| 6,275,726 | B1 | * | 8/2001 | Chan | A61B 5/0059 356/432 |

(Continued)

OTHER PUBLICATIONS

Beilei et al., "Underwater image color correct in extremely poor visibility," 2013 OCEANS—San Diego, San Diego, CA, 2013, pp. 1-4.*

(Continued)

*Primary Examiner* — Mohammad J Rahman
(74) *Attorney, Agent, or Firm* — The Roy Gross Law Firm, LLC; Roy Gross

(57) ABSTRACT

A method comprising acquiring a first image of a scene inside a medium, under illumination from a first location or orientation. The method comprises an action of acquiring a second image of the scene inside the medium, under illumination from a second, different location or orientation. The method comprises an action of computing attenuation coefficients, one per color channel, based on backscatter in the first and second images.

20 Claims, 13 Drawing Sheets

(51) Int. Cl.
 *G06T 7/90* (2017.01)
 *H04N 9/04* (2006.01)
 *H04N 9/64* (2006.01)

(52) U.S. Cl.
 CPC ... *H04N 9/646* (2013.01); *G06T 2207/10024* (2013.01); *G06T 2207/10152* (2013.01); *G06T 2207/20224* (2013.01)

(56) References Cited

U.S. PATENT DOCUMENTS

| | | | |
|---|---|---|---|
| 7,236,201 B1 | 6/2007 | Gershenson | |
| 8,350,957 B2* | 1/2013 | Schechner | H04N 5/23232 348/370 |
| 8,836,810 B2* | 9/2014 | Schechner | H04N 5/23232 348/222.1 |
| 2002/0015305 A1* | 2/2002 | Bornhorst | G02F 1/133385 362/293 |
| 2003/0137669 A1* | 7/2003 | Rollins | G01N 21/4795 356/479 |
| 2008/0084496 A1 | 4/2008 | Vasilescu et al. | |
| 2009/0295933 A1* | 12/2009 | Schechner | G06T 5/007 348/222.1 |
| 2010/0004499 A1* | 1/2010 | Brigatti | A61N 5/1017 600/7 |
| 2012/0132255 A1* | 5/2012 | Schmaelzle | H01L 31/0547 136/248 |
| 2012/0168630 A1* | 7/2012 | Beddar | G01T 1/04 250/362 |
| 2013/0093924 A1 | 4/2013 | Schechner et al. | |
| 2015/0250436 A1* | 9/2015 | Hyde | G01T 1/244 378/62 |
| 2016/0238698 A1* | 8/2016 | Vuorenkoski-Dalgleish | G01S 17/003 |
| 2017/0273667 A1* | 9/2017 | Labyed | G01S 15/8915 |
| 2019/0237348 A1* | 8/2019 | Li | G01J 5/60 |

OTHER PUBLICATIONS

Chiang et al., "Underwater Image Enhancement by Wavelength Compensation and Dehazing", IEEE Transactions on Image Processing, vol. 21, No. 4, Apr. 2012.*
Search Report IEEE.*
Search Report IP.com.*
Spier, et al., "In Situ Target-Less Calibration of Turbid Media", IEE Xplore Digital Library, ISSN 2472-7636, (2017).
International Search Report and Written Opinion of the Searching Authority, International Application No. PCT/IL2018/050297, dated Jul. 10, 2018.
Bryson, M. et al., True Color Correction of Autonomous Underwater Vehicle Imagery. Journal of Field Robotics, 33(6), 853-874 (2015).
Treibitz, T. et al., Turbid Scene Enhancement Using Multi-Directional Illumination Fusion. IEEE Transactions on Image Processing, 21(11), 4662-4667, (2012).
Tsiotsios et al., Effective Backscatter Approximation for Photometry in Murky Water, Journal of Lteax Class Files, vol. 13, No. 9, 2016.

* cited by examiner

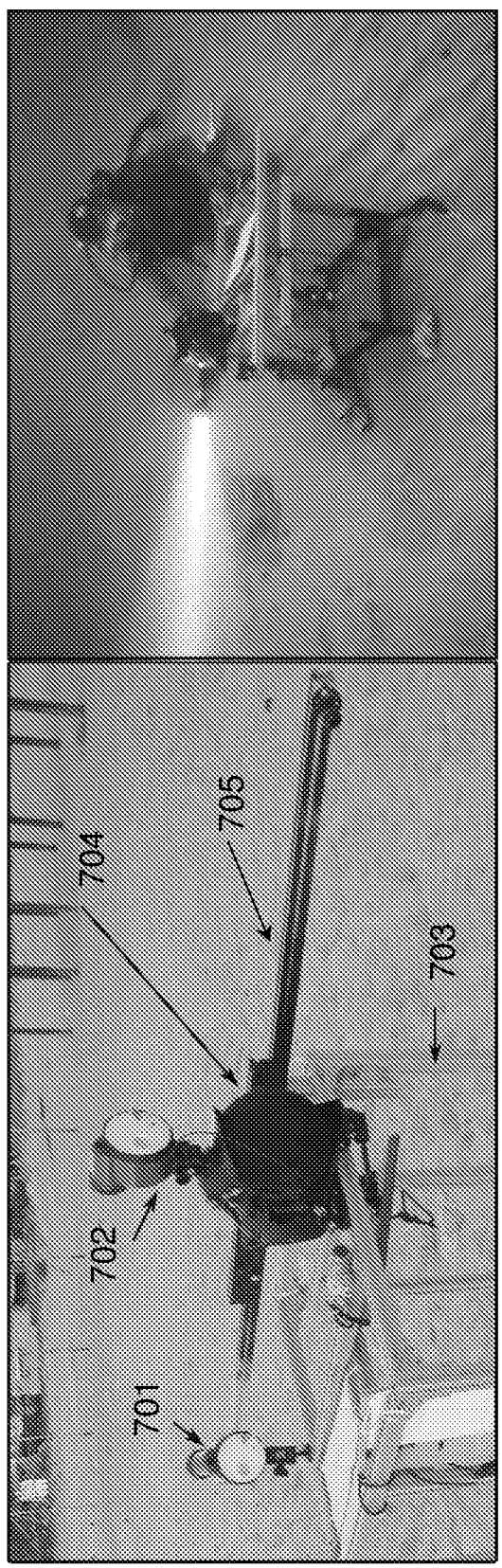

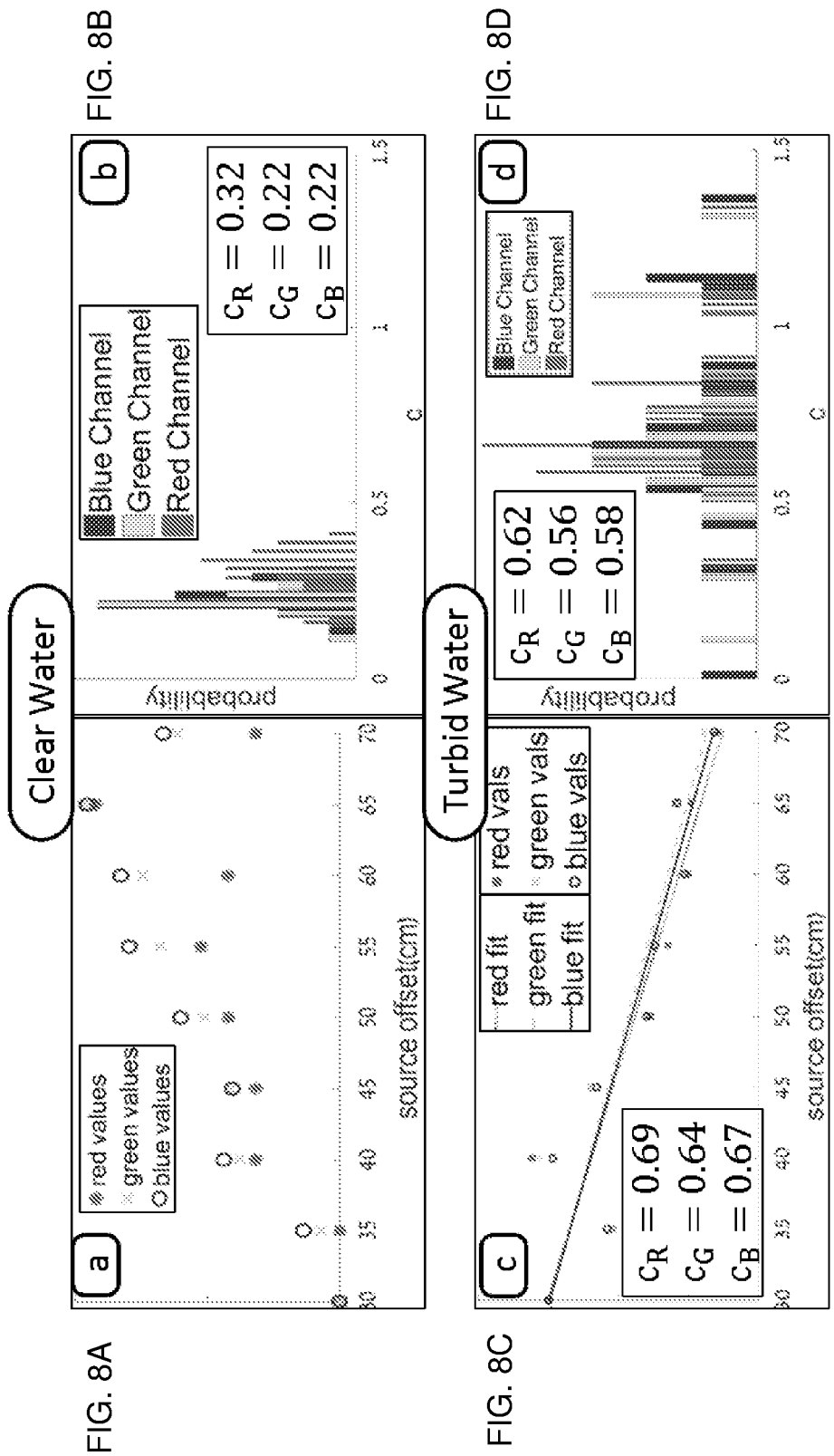

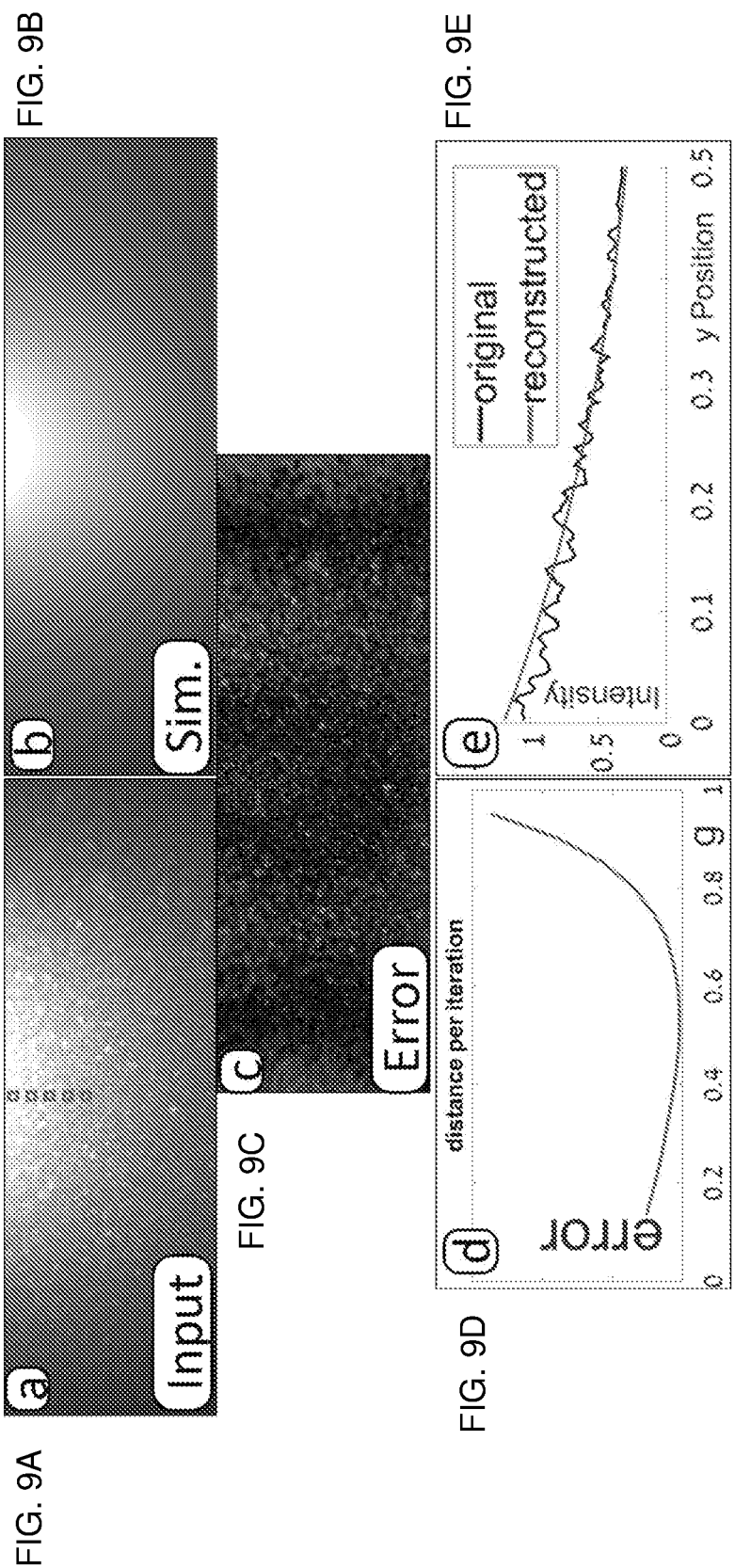

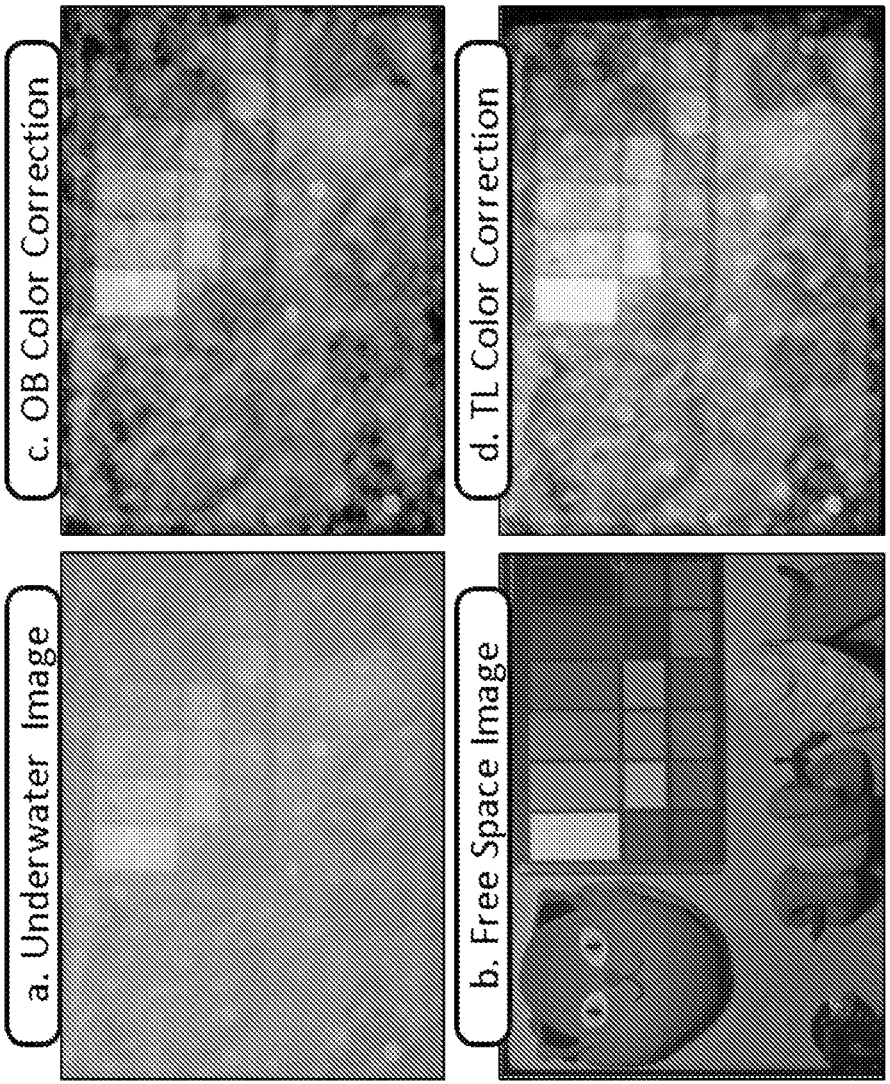

TARGET-LESS CALIBRATION OF TURBID MEDIA

CROSS REFERENCE TO RELATED APPLICATIONS

This application is a National Phase of PCT Patent Application No. PCT/IL2018/050297 having International filing date of Mar. 13, 2018, which claims the benefit of priority from U.S. Provisional Patent Application No. 62/470,527, filed on Mar. 13, 2017, entitled "IN SITU TARGET-LESS CALIBRATION OF TURBID MEDIA." The contents of the above applications are all incorporated by reference as if fully set forth herein in their entirety.

BACKGROUND

The invention relates to the field of image processing.

The color of an object imaged in a turbid medium varies with distance and medium properties, where color may be an unstable source of information. When three-diemnsional (3D) scene information becomes relatively easy to reconstruct, the main challenge in color recovery is estimating medium properties, at the time of acquisition. Existing attenuation calibration methods use either color charts, external hardware, or multiple images of an object.

To compensate for the effects of turbid medium in image processing, two components may be accounted for: attenuation and scattering. For standard color imaging, three attenuation parameters may be estimated, one per color channel. These three attenuation parameters may be measured externally with a transmissiometer or spectrometer. It may be difficult to use these measurements in computer vision or imaging applications, due to differences in sensor spectral sensitivity and acceptance angles.

A common and simple method for estimating attenuation from images may be to acquire an image of a known calibration target at known distances. This technique may use a calibration target, which may be cumbersome, especially with underwater vehicles. Using an external target may be alleviated in several methods that use multiple images of the same object from several distances, where only image difference may be known, or where distances may be known by using a sonar or structure-from-motion. For example, a grey-world assumption is used, but this does not always hold, for example, when looking into the water column. Backscatter may be ignored when the light source is further away from the camera, but this reduces signal-to-noise-ratio, and sometimes difficult to implement.

Backscatter was previously removed by using the characteristic that backscatter saturates quickly and by working beyond the saturation distance. Other techniques remove backscatter using multiple images. Backscatter may be estimated using a simplified model in a global optimization framework, requiring multiple object images.

In general, fully modeling scattering requires estimating many parameters: scattering coefficient per wavelength per angle. The popular Henyey-Greenstein approximation relaxes this technique by formulating a phase function that depends on two parameters per wavelength. For example, in the case of color imaging, nine parameters are required. The medium parameters may be found by minimizing the error of the difference between medium and clear water images vs. theoretical single scattering image formation model. To implement this method an additional diffuse lamp that is not used for imaging may be added. We want to avoid that as in underwater vehicles it means additional space, underwater power connectors, cables and hardware.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising acquiring a first image of a scene inside a medium, under illumination from a first location or orientation. The method comprises an action of acquiring a second image of the scene inside the medium, under illumination from a second, different location or orientation. The method comprises an action of computing attenuation coefficients, one per color channel, based on backscatter in the first and second images.

There is provided, in accordance with an embodiment, a camera comprising: an image sensor; an illuminator; an actuator configured to change at least one of a location and an orientation of said illuminator; and a hardware processor operatively coupled with said image sensor, illuminator, and actuator. The hardware processor is configured to acquire a first image of a scene inside a medium, under illumination from a first location or orientation. The hardware processor is configured to acquire a second image of the scene inside the medium, under illumination from a second, different location or orientation. The hardware processor is configured to compute attenuation coefficients, one per color channel, based on backscatter in the first and second images. The first and second images are acquired by said image sensor. The illumination is provided by said illuminator. The illumination from the first and second locations is by changing at least one of the location and the orientation of said illuminator.

There is provided, in accordance with an embodiment, a camera comprising: an image sensor; at least two illuminators; and a processor operatively coupled with said image sensor, illuminators, and actuator. The hardware processor is configured to acquire a first image of a scene inside a medium, under illumination from a first location or orientation. The hardware processor is configured to acquire a second image of the scene inside the medium, under illumination from a second, different location or orientation. The hardware processor is configured to compute attenuation coefficients, one per color channel, based on backscatter in the first and second images. The first and second images are acquired by said image sensor. The illumination from the first location or orientation is provided by a first one of said illuminators. The illumination from the second location or orientation is provided by a second one of said illuminators.

There is provided, in accordance with an embodiment, a camera comprising: an image sensor; a first illuminator; and at least one hardware processor operatively coupled with said image sensor and first illuminator. The at least one hardware processor is configured to acquire, using the image sensor, a first image of a scene inside a medium, under a first illumination, by said first illuminator, from a first location and first orientation. The at least one hardware processor is configured to acquire, using the image sensor, a second image of the scene inside the medium, under a second illumination, by said first illuminator, from at least one of a different location and a different orientation. The at least one hardware processor is configured to compute attenuation coefficients, one per color channel, based on backscatter in the first and second images.

There is provided, in accordance with an embodiment, a submersible vehicle comprising: an image sensor; a first illuminator; at least one hardware processor operatively coupled with said image sensor and first illuminator. The at least one hardware processor is configured to acquire, using the image sensor, a first image of a scene inside a medium, under a first illumination, by said first illuminator, from a first location and first orientation. The at least one hardware processor is configured to acquire, using the image sensor, a second image of the scene inside the medium, under a second illumination, by said first illuminator, from at least one of a different location and a different orientation. The at least one hardware processor is configured to compute attenuation coefficients, one per color channel, based on backscatter in the first and second images.

In some embodiments, the method further comprises estimating scattering parameters of the first image, the second image, or a third image of the scene, based on the computed attenuation coefficients.

In some embodiments, the method further comprises constructing a color-corrected image of the scene based on the scattering parameters and the attenuation coefficients.

In some embodiments, the method further comprises accelerating the estimation of scattering parameters, by the first and second illumination locations or orientations being both along an optical axis of a camera used to acquire the first and second images, such that backscatter appearing in the first and second images is symmetrical.

In some embodiments, the medium is water.

In some embodiments, the medium is turbid water.

In some embodiments, the hardware processor is further configured to estimate scattering parameters of the first image, the second image, or a third image of the scene, based on the computed attenuation coefficients.

In some embodiments, the hardware processor is further configured to construct a color-corrected image of the scene based on the scattering parameters and the attenuation coefficients.

In some embodiments, the hardware processor is further configured to accelerate the estimation of scattering parameters, by: the first and second illumination locations or orientations being both along an optical axis of a camera used to acquire the first and second images, such that backscatter appearing in the first and second images is symmetrical.

In some embodiments, the at least one hardware processor is further configured for estimating scattering parameters of the scene from at least one of the first image, the second image, and a third image, based on the computed attenuation coefficients.

In some embodiments, the at least one hardware processor is further configured for constructing a color-corrected image of the scene, from at least one of the first image, the second image, and the third image, and wherein the constructing uses at least one of the scattering parameters and the attenuation coefficients.

In some embodiments, the at least one hardware processor is further configured for accelerating the estimation of scattering parameters, by: the first and second illuminations comprising an illumination axis being both along an optical axis of the image sensor used to acquire the first and second images, such that backscatter appearing in the first and second images is symmetrical.

In some embodiments, the medium is at least one of water, and turbid water.

In some embodiments, the camera further comprises a second illuminator for performing the second illumination.

In some embodiments, the camera further comprises an actuator for changing the first illuminator from the first location and first orientation to the different location and different orientation.

In some embodiments, the least one hardware processor is further configured for (i) acquiring a third image, and (ii) constructing a color-corrected image of the scene from the third image, based on at least one of the computed attenuation coefficients and the scattering parameters of the scene.

In some embodiments, the least one hardware processor is further configured to correct for vignetting at least one of the first image, the second image, and the third image.

In some embodiments, the attenuation coefficient is computed based on a subset of the first and second images.

In some embodiments, the attenuation coefficient is computed based on a median value.

In some embodiments, the attenuation coefficient is computed using an outlier removal.

In some embodiments, the subset is an element from the group consisting of at least one scan line, at least one rectangle area, at least one square area, at least one circular area, and at least one polygon area.

In some embodiments, the subset comprises between 100 and 1,000,000 pixels.

In some embodiments, the submersible vehicle further comprises a second illuminator for performing the second illumination.

In some embodiments, the submersible vehicle further comprises an actuator for changing the first illuminator from the first location and first orientation to the different location and different orientation.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 7A shows a first image of experimental results setup for target-less calibration in a turbid medium;

FIG. 7B shows a second image of experimental results setup for target-less calibration in a turbid medium;

FIGS. 8A-8D show images of attenuation estimation experimental results for target-less calibration in a turbid medium;

FIGS. 9A-9E show images of scattering estimation experimental results for target-less calibration in a turbid medium;

FIGS. 10A-10D show images of object reconstruction experimental results for target-less calibration in a turbid medium;

DETAILED DESCRIPTION

Disclosed herein are methods, devices, and computer program products for correcting the colors of digital images to compensate for the effect of medium properties between a camera and an object (such as attenuation and scattering). Two or more digital images, depicting at least in part a homogenous background scene, are acquired, each showing backscattered light from a system's light sources but with varying distances from the lightsource to the camera. These images are used to compute coefficients for attenuation and scaterring correction of the digital images. This may be advantagous in turbid media where the object image is noisy, and may alleviate correspondence matching, which may be difficult in high turbidity.

For exmaple, a simple and efficient method for turbid water medium parameters calibration is based on backscattered light, that uses the actual imaging hardware as opposed to dedicated calibration hardware. The method may calibrate both attenuation and scattering properties and once the calibration has completed, color images may be reconstructed with color correction.

The inherent optical properties may be recovered in a turbid medium (attenuation and scattering) such that, a digital image of a 3D structure may be reconstructed with color-consistency, i.e., an object may have the same reconstructed color regardless of the imaging distance, water properties, light source location, etc. This technique may enable color as a reliable information source, such as for scientific research, environmental protection/control, augmented realities, and/or the like. For example, coral reefs are endangered world-wide, and their color is an important cue for their health.

The estimation may be done robustly, since medium properties exhibit spatio-temporal variations. Existing, less advantagous, methods may use additional hardware, such as calibration targets at a fixed distance, a transmissiometer, multiple images of the same object requiring correspondence matching in a challenging medium, and/or the like.

When acquiring images in a scattering media, even when there is no object along the line-of-sight (LOS), significant light may be acquired. This light includes light that is scattered back from the medium to the camera, termed backscatter. The techiniques described herein use the backscatter light without an object as a calibration target. Using two images of the backscattered light with slightly varying light source locations enables estimation of image attenuation. Once attenuation is estimated, it is used to estimate scattering parameters using one image.

Figure 1:
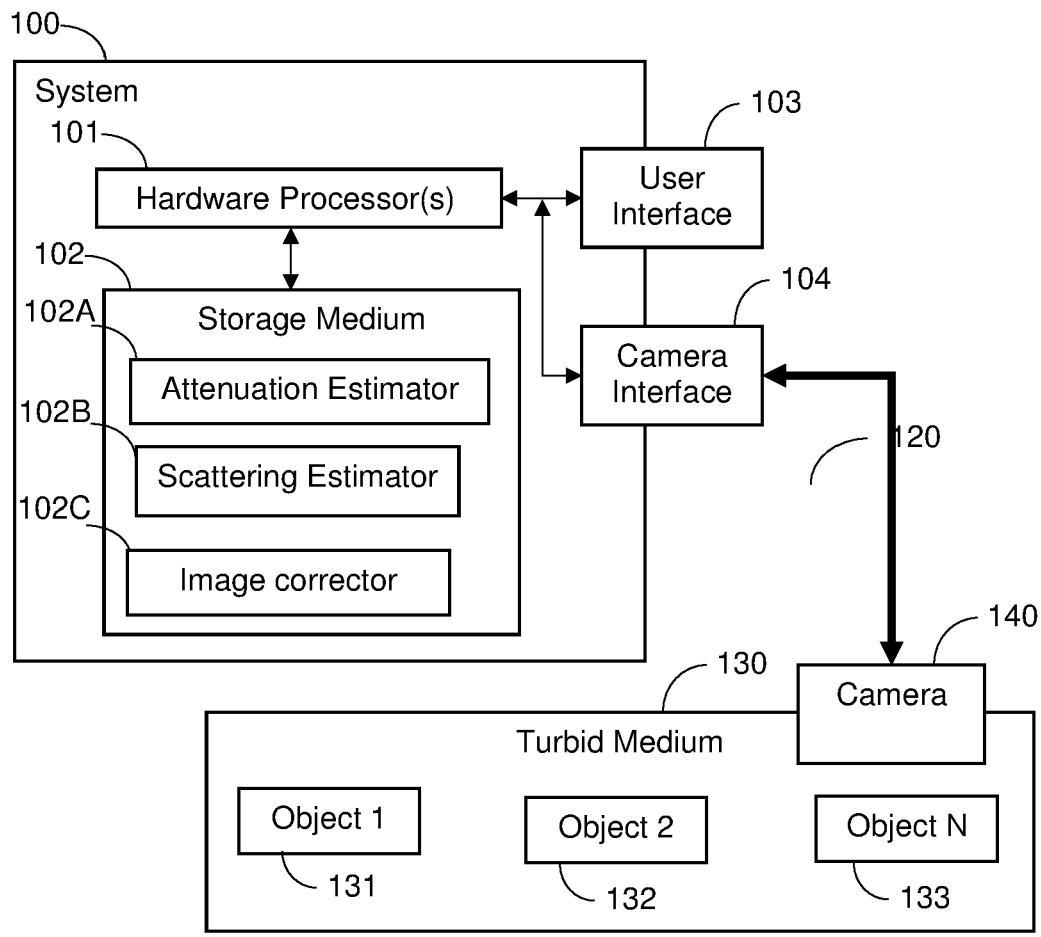
FIG. 1 shows schematically a system for target-less calibration in a turbid medium.
Figure 2:
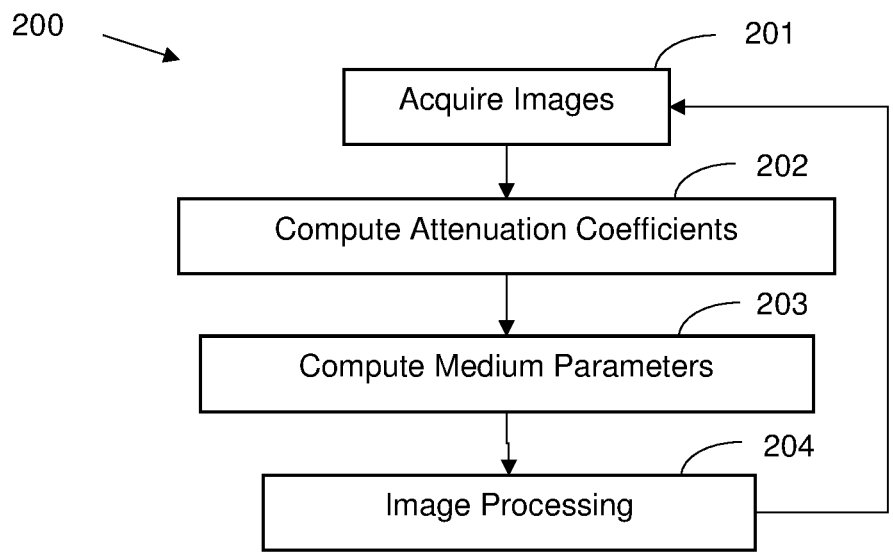
FIG. 2 shows a flowchart of a method for target-less calibration in a turbid medium.

Reference is now made to FIG. 1 and FIG. 2, which show schematicaly a system 100 and a flowchart 200 of a method for target-less calibration in a turbid medium 130. System 100 comprises one or more hardware processors 101, a non-transitory computer readable storage medium 102, a user interface 103, and a camera interface 104. Storage medium 102 comprises software modules, such as 102A, 102B, and 102C, each module comprising processor instructions configured to execute on hardware processor(s) to perform the actions disclosed herein. Camera interface 104 is connected to a data bus 120 for retrieving images form a visual sensor, such as a camera 140. Camera 140 acquires 201 images depicting objects, such as 131, 132, and 133, in turbid media 130. Such as acquiring images using an Image Collector 102C module stored on the medium 102. An Attenuation Estimator 102A module, stored on storage medium 102, receives images of a background scene in turbid medium 130 and computes 202 one or more attenuation coefficient for any of the color channels of the camera image. A Scattering Estimator 102B receives the one or more attenuation coefficient and computes 203 medium parameters of an image acquired depicting an object (objective image) and may use the one or more attenuation coefficient and/or the medium parameters to process 204 the objective image.

In some embodiments the camera is separate from the processing system (i.e., processing is done offline). For example, digital images are acquired with an off the shelf camera and the color calibration is performed as a post processing step on a computer. For example, digital video is acquired with a commercial news video camera, and the color calibration is performed as a post processing step on a computer at the news agency.

In some embodiments, the entire system resides inside the camera. For example, an underwater camera incorporates the techniques to perform color calibration during the acquisition of images, video, and/or the like.

In some embodiments, software is configured to execute the method and loaded onto a system comprising a camera. For example, the software is load onto a waterproof portable computing device (e.g., a smartphone) and when executed preprocesses acquired images, video, etc.

In an exemplary embodiment, a video frame is analyzed frame by frame to detect homogenous background areas, and these subsets can be analyzed offline for better image reproduction and color calibration. For example, during the streaming of a video, a background area is detected, and a strobe is signaled to flash while at alternate orientation location during the background scene. For example, at least part of the image depicts the background scene.

Following are detailed descriptions of aspects of some embodiments.

Figure 3A:
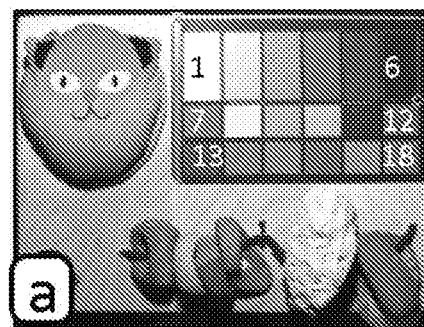
FIGS. 3A-3C show images of color consistency visualization for target-less calibration in a turbid medium.
Figure 3B:
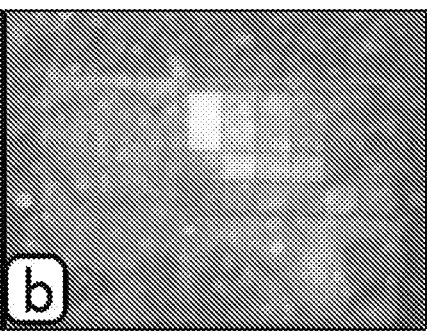
Figure 3C:
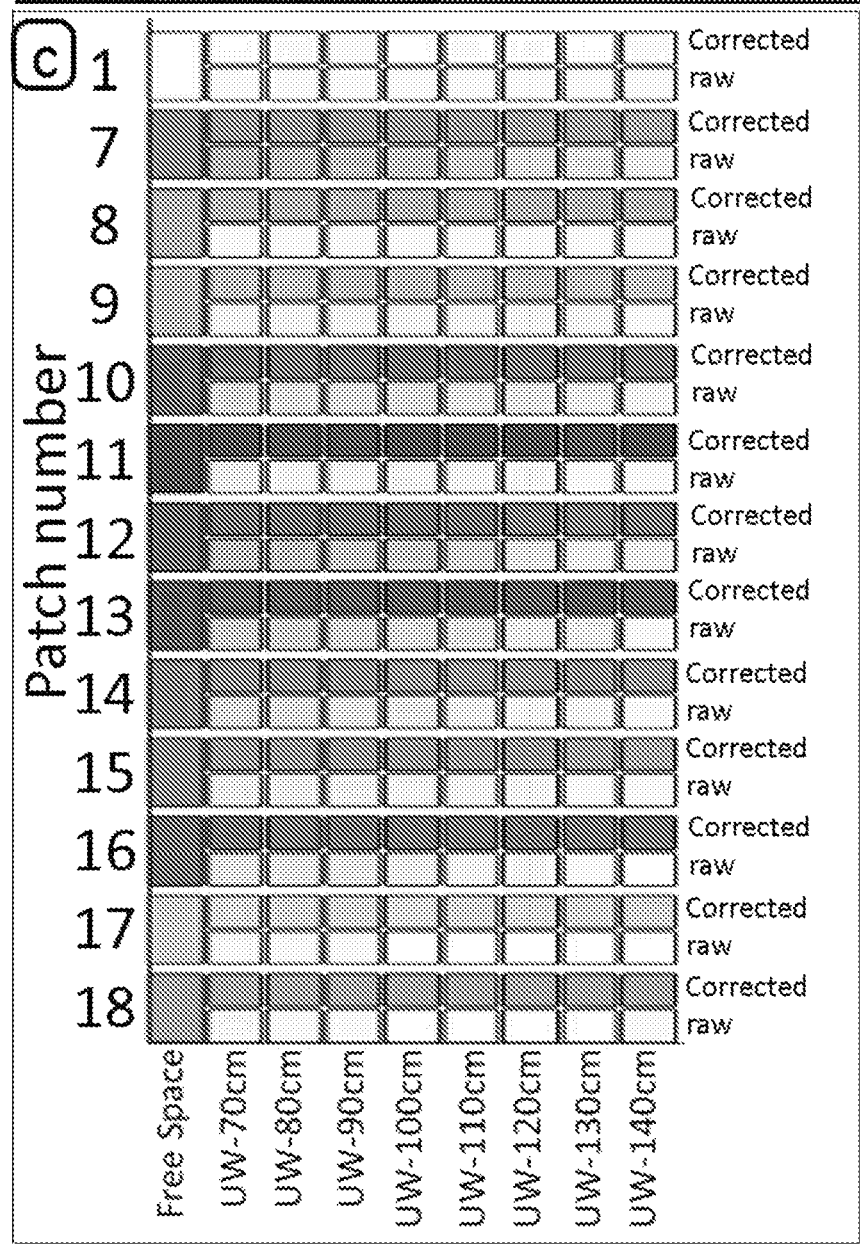

Reference is now made to FIG. 3, which shows images of a color consistency visualization for target-less calibration in a turbid medium. Color consistency visualization image on the top left shows an object depicted in free space (air), and the image on the top right shows an object depicted underwater at a distance of 140 centimeters. Color patches are arranged in two rows per patch. For each row, bottom part shows measured color values from underwater images and top part shows the colors are significantly improved after applying a target-less calibration method. The free space value patch is shown on the left.

Figure 4B:
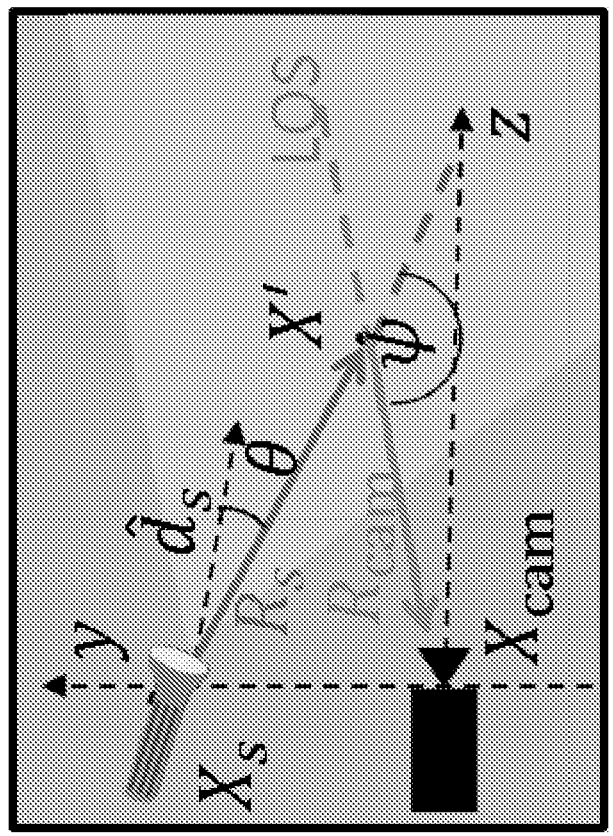
FIG. 4B shows second images of model formation and notations for target-less calibration in a turbid medium.
Figure 4A:
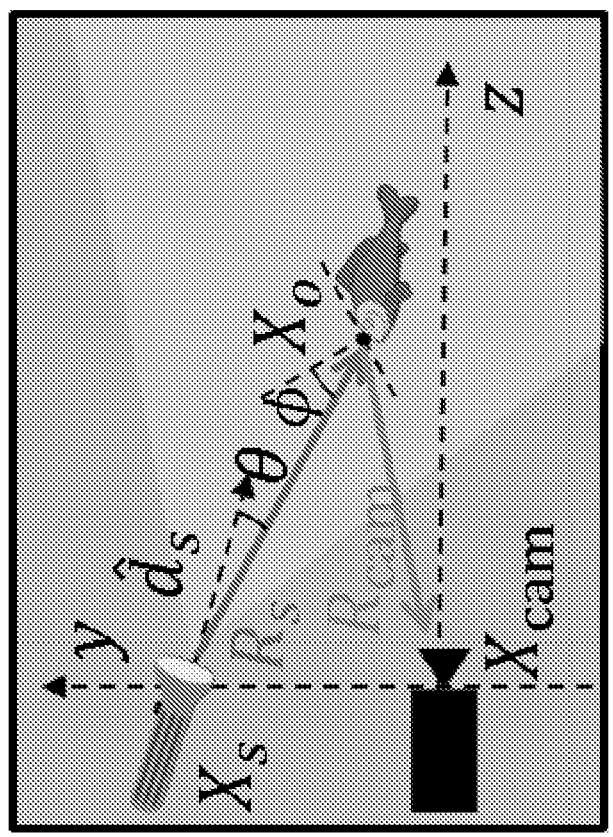
FIG. 4A shows first images of model formation and notations for target-less calibration in a turbid medium.

Following is a description of the image model arrangement. Reference is now made to FIG. 4A and 4B, which show first and second images of model formation and notations for target-less calibration in a turbid medium. The model setup contains a pinhole camera at world coordinates $X_{cam}=(0,0,0)$, with the z-axis defined as the optical axis. An artificial light source is located at $X_S$ and an object at $X_O$ (FIG. 4 left). Ambient light may be neglected as it may be significantly weaker than the artificial source or may be acquired in a sperate image and subtracted. The direction of the main light source axis is $\hat{d}_S$ (a unit vector). The total irradiance $I_t$ sensed on pixel x is composed of two components:

$$I_t(x)=I_d(x)+B(x), \quad (EQN\ 1)$$

where $I_d$ denotes the direct component, i.e. the attenuated object signal. The term B is the backscatter, that is composed of light that is scattered back from the medium into the sensor along the LOS, carrying no object information. Forward scattering may be neglected as this component is usually weaker than the other two. For brevity, the coordinate notation x is omitted. Images may be corrected for vignetting before image processing. FIG. 4A shows components of the light signal arriving from object, $I_d$, and FIG. 4B shows components from a single scattering event, $B_{point}$ (X'). Integrating $B_{point}$(X') over the LOS yields the backscatter signal B.

In each color channel k=R, G, B the object signal $I_d$ is:

$$I_d^{(k)} = \frac{I_S^{(k)} \cdot Q(\theta) \cdot \cos(\phi) \cdot L_O^{(k)} \cdot e^{-c^{(k)} \cdot (R_S + R_{cam})}}{R_S^2} \quad (EQN\ 2)$$

where $I_S$ denotes the light source intensity adapted to the camera sensitivity. The spatial distribution of the light source Q may be radially symmetric, depending on $\theta$, the angle between source direction and object. The source may illuminate not more than half a sphere, i.e., $Q(\theta>\pi/2)=0$. $L_O$ denotes the reflectance of the object. The object may be Lambertian, i.e., light is scattered from the object equally in all directions and depends on the cosine of the angle $\Phi$ between the incident light direction and the normal of the surface. The medium attenuates the light exponentially as a function of the attenuation coefficient c. The distances $R_S$ and $R_{cam}$ denote the distance between source and object, and between object and camera, respectively. In addition, the light source may be subject to free space falloff $1/R_S^2$. Note that (k) denotes the color channel, and not a power operation.

Optionally, the light source is a strobe, a flash, a flashlight, an illuminator, and/or the like. For example, a strobe is used to acquire calibration images and a flash to acquire video frames that need color correction. The calibration images are at least two images acquired with the strobe when the location/orientation of the strobe has changed, and the vide frames may be the third image, the fourth image, etc. Optionally, the light source and camera are configured to acquire digital images in the visible light range, in the ultra-violet light range, the infrared light range, any combination of light ranges thereof, any subrange thereof, and/or the like. Optionally, the range of is expressed as wavelengths, frequencies, colors, spectrums, and/or the like.

For scattering, a single scattering model may be used, i.e., every ray emitted from the source goes through not more than one scattering event before reaching the sensor. A scattering event from a point in space X' contributes:

$$B_{point}^{(k)}(X') = I_S^{(k)} \cdot Q(\theta) \frac{e^{-c^{(k)} \cdot [R_S + R_{cam}]}}{R_S^2} \beta^{(k)}(\Psi), \quad (EQN\ 3)$$

where $\beta$ denotes the Volume Scattering Function (VSF) of the medium, that depends on the scattering angle $\Psi$ and color. The variables $R_s$, $R_{cam}$, $\Psi$ depend on the coordinate X'.

The total backscatter signal B may result from integrating $B_{point}^{(k)}$(X') along the LOS from the camera to the imaged object at $X_O$.

$$B^{(k)}=\int_0^{X_O} B_{point}^{(k)}(X')dX'. \quad (EQN\ 4)$$

When there is no object along the LOS, the integration ends at infinity and we denote the resulting backscatter $B_{28}$, $$B_\infty^{(k)}=\int_0^\infty B_{point}^{(k)}(X')dX' \quad (EQN\ 5)$$

The shape of the scattering function in the ocean (as a function of both color and angle) may depend on the distribution of the sizes and types of the scattering particles in the water. Due to the complexity of measuring such data, there are not many measurements available. Measurements were taken by using instruments with narrow band sensitivity centered around 520 nanometers.

Here, we follow a common approximation and model the VSF by the Henyey-Greenstein Phase Function (HGPF):

$$\beta^{(k)}(\Psi, g) = \beta_{HG}^{(k)} \frac{1-(g^{(k)})^2}{1+(g^{(k)})^2 - 2g^{(k)}\cos\Psi} \quad (EQN\ 6)$$

where $\beta_{HG}$, g denote parameters describing the medium.

The analysis above demonstrates that when objects are imaged in a medium their color varies with distance and water properties. Combining EQN 1 and EQN 2, the recovered object intensity is:

$$L_O^{(k)}I_S^{(k)} = \frac{[I_t^{(k)} - B^{(k)}] \cdot R_S^2 \cdot e^{c^{(k)} \cdot (R_{cam}+R_S)}}{Q(\theta) \cdot \cos(\phi)}. \quad (EQN\ 7)$$

Examining EQN 7 the correction parameters may be divided into several groups. First, geometrical setup variables that may be measured: camera and source locations $X_S$ and $X_{cam}$ and light source direction $\hat{d}_S$. Second, hardware properties (Q) that may be calibrated. Third, scene structure $X_O$ that may be roughly estimated (by stereo, sonar, etc.). Last, medium parameters ($c^{(k)}$, $g^{(k)}$, $\hat{\beta}_{HG}^{(k)}$, which require calibration per color channel in every medium.

Following are disclosed some aspects of calibration algorithm embodiments. For comparison, Object Based (OB) calibrations are used. The Target-Less (TL) calibration technique may be split into an attenuation calibration step and a scattering calibration step.

For comparison, the OB technique estimated the attenuation coefficient c using two images of the same object acquired at different distances from the camera while assuming the backscatter is negligible. Then, $$c = \frac{\ln\left[\frac{I_{t,1}}{I_{t,2}}\left(\frac{R_{S,1}}{R_{S,2}}\right)^2 \cdot \frac{Q_1}{Q_2} \cdot \frac{\cos(\phi_1)}{\cos(\phi_2)}\right]}{(R_{S,2} + R_{cam,2} - R_{S,1} - R_{cam,1})},$$ (EQN 8)

where the sub-indexes 1 and 2 represent the two different images. This technique was originally demonstrated in a water tank, and as shown below, may not be stable in real conditions. In the case of a high turbidity medium, before applying EQN 8 a saturated backscatter signal $B_\infty$ imaged beforehand, is subtracted in order to overcome the backscatter effect. To compensate for noise, 5 separately acquired backscatter images were averaged and used as the backscatter image. Further improvements to the OB technique were made by using 8 images at different distances (instead of two) and calculated c using EQN 8 for all $$\binom{8}{2} = 28$$

possible image pairs. This yielded 28 different estimated values for c. To choose among them a voting scheme was applied where the value that got the most votes was chosen as the calibration result. However, in turbid water the voting was not decisive, and the median value of all estimations was chosen as the result. Note that this technique may be a representative for many object-based techniques, as most are based on the same calibration equation, with added steps for 3D estimation and registration of images.

The TL technique uses at least two backscatter images from which the attenuation coefficient may be derived, without using any calibration target.

Consider two backscatter images, $B_\infty^I$ and $B_\infty^{II}$ that are taken with two different light source locations, where the light source is moved $\Delta z$ along the optical axis between acquisitions. The light source points forward, i.e., $\hat{d}_S=[0,0,1]$, and all light from the light source is emitted forward. Since $B_\infty$ images are background images (i.e., no object along the LOS), the coordinates of this movement may be described by the camera movement:

$$z_{cam}^{II} = z_{cam}^I - \Delta z, \ (x,y)_{cam}^I = (x,y)_{cam}^{II} = (0,0)$$ (EQN 9)

Figure 5A:
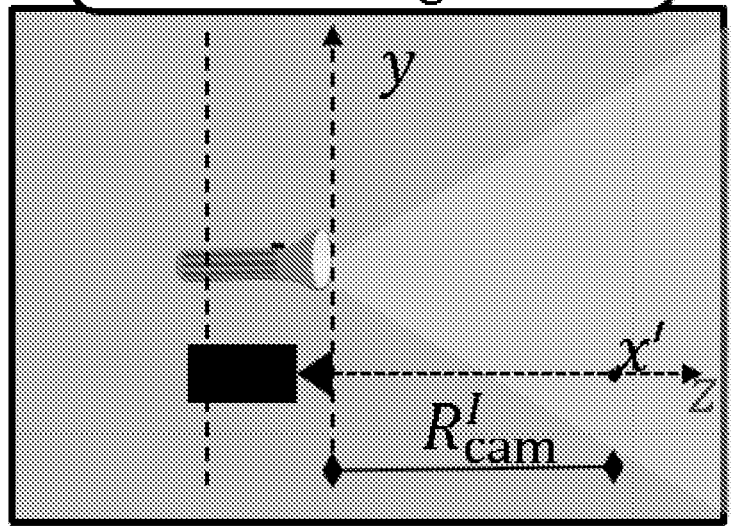
FIG. 5A shows a first image of attenuation estimation for target-less calibration in a turbid medium.
Figure 5B:
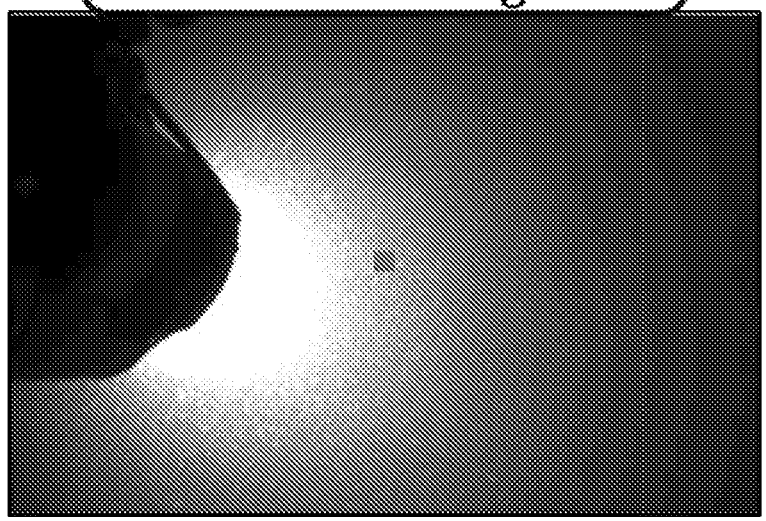
FIG. 5B shows a second image of attenuation estimation for target-less calibration in a turbid medium.
Figure 5C:
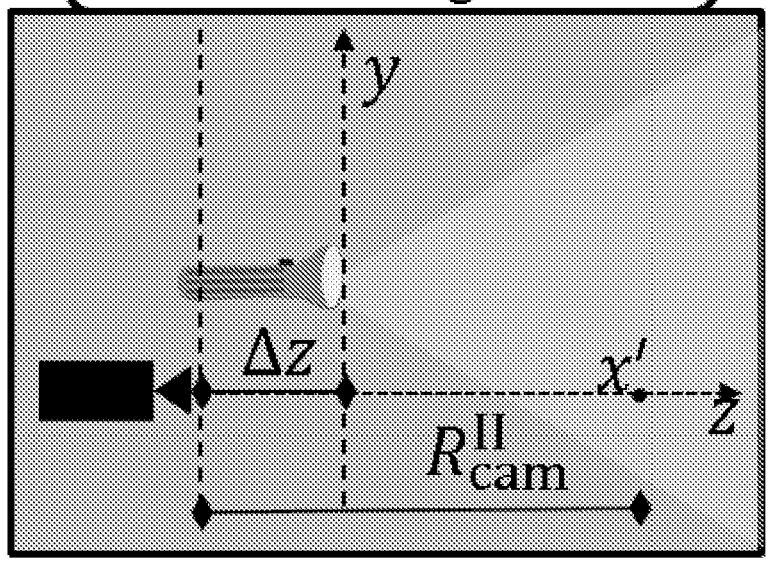
FIG. 5C shows a third image of attenuation estimation for target-less calibration in a turbid medium.
Figure 5D:
FIG. 5D shows a fourth image of attenuation estimation for target-less calibration in a turbid medium.
Figure 6A:
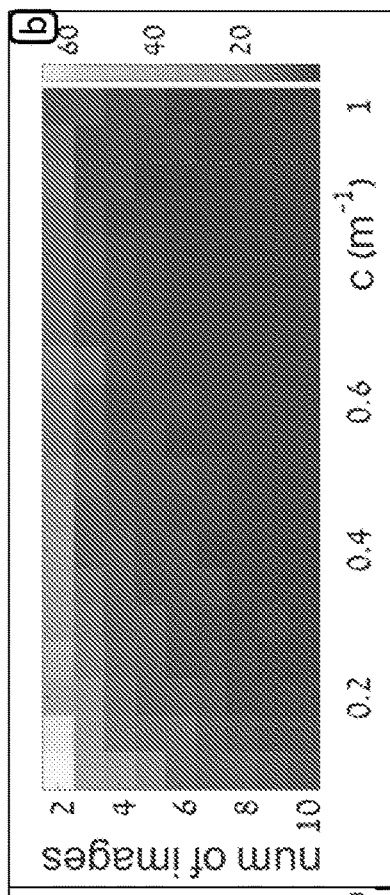
FIGS. 6A-6D show images of simulations for target-less calibration in a turbid medium.
Figure 6B:
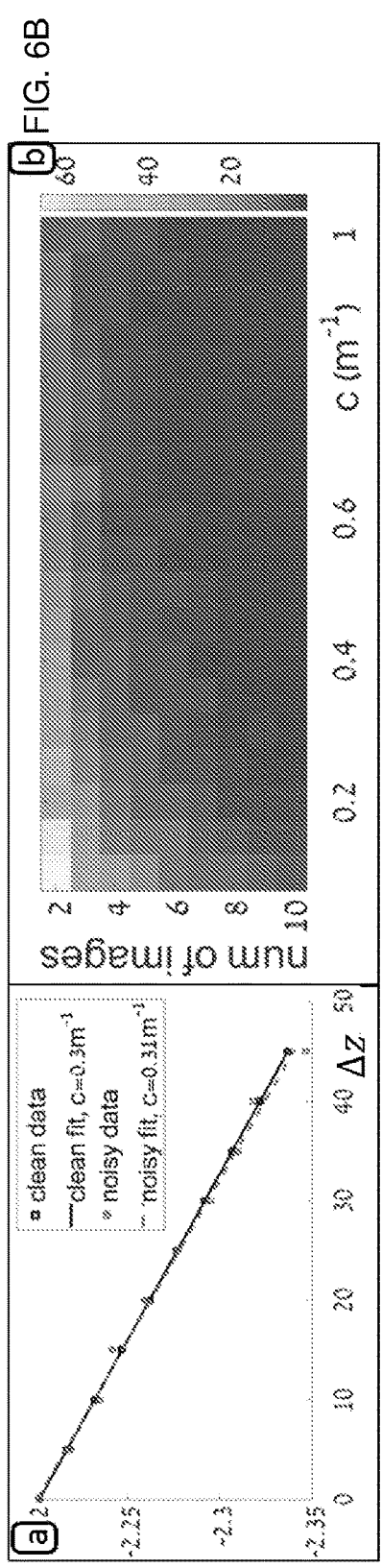
Figure 6C:
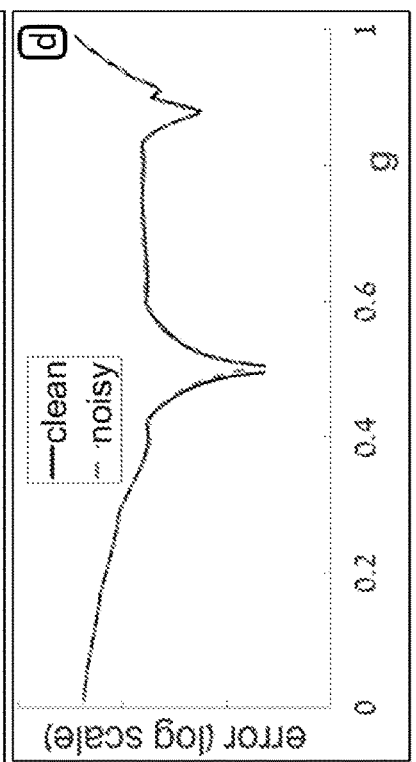
Figure 6D:
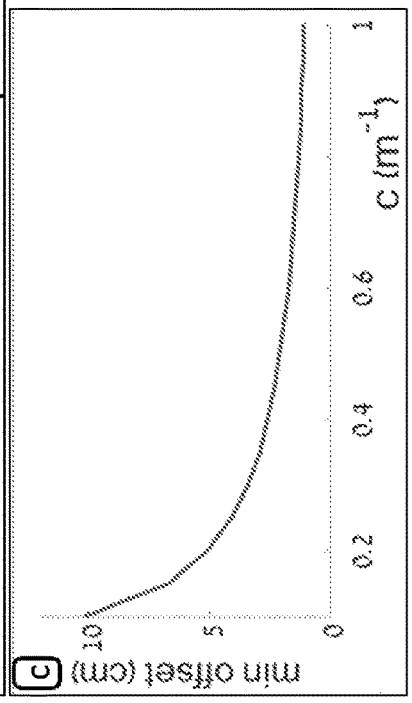

Reference is now made to FIG. 5A thru FIG. 5D, which shows images of attenuation estimation for target-less calibration in a turbid medium. The camera images an area with no object, and then the light source is moved $\Delta z$ distance backwards. Due to the geometrical symmetry, the difference in the $B_\infty$ value at the central pixel between the two images FIG. 5A and FIG. 5C, is just the attenuation due to the added $\Delta z$ path of the camera. Further depicted are actual calibration images FIG. 5B and FIG. 5D taken underwater (green channel), the red squares denote the central image area, from where the calibration values are taken. Black object in the left is the strobe. Image areas close to the strobe are overexposed to reach high enough signal-to-noise ratio (SNR) in the central. The pixel at x=0, i.e., the pixel whose LOS is the optical axis., has a difference between each point X' along the LOS in the calculation of $B_\infty^I$ and $B_\infty^{II}$ is just $R_{cam}$:

$$R_{cam}^{II}(X') = R_{cam}^I(X') + \Delta z, \ \forall X'.$$ (EQN 10)

The rest of the parameters are related to the source, and therefore do not change. Plugging EQN 10 in EQN 5 yields the simple relation $$B_\infty^{II}(x=0) = e^{-c \cdot \Delta z} \cdot B_\infty^I(x=0)$$ (EQN 11)

Then based on EQN 11, the attenuation coefficient c per color channel k is:

$$c^{(k)} = -\frac{1}{\Delta z} \ln \frac{(B_\infty^{II})^{(k)}}{(B_\infty^I)^{(k)}}.$$ (EQN 12)

Since the calibration image is an image of a homogenous background, such as the medium itself, there is no need for registration between multiple images of the same object, which may be difficult in a turbid environment.

Optionally, the median value from a square of 100×100 pixels at the center of the frame may be used as the attenuation coefficient. Optionally, the median is for a subset of the images, such as a subset comprising a row, a column, a circle, a rectangle, a polygon, and/or the like. Optionally, the subset comprises between 100 and 1,000,000 pixels. Furthermore, two images may be used by performing a least squares linear fit between log of the intensity and source offset. The negative slope of this linear fit is the attenuation coefficient c. To handle outliers, fits with up to 25% outliers were chosen with the lowest root-mean-square error. The linear fit quality may be used as an indication for the accuracy of the calibration.

The backscatter at the center of the image may be strong enough for the camera to sense. This means that the TL technique may be less suitable for clear water. For example, the TL technique worked well in approximated daylight visibility of 1 to 6 meters depth.

Reference is now made to FIG. 6, which shows images of simulations for target-less calibration in a turbid medium. FIG. 6 depicts simulated properties and expected performance of this method according to the single scattering model. The graph on the top left demonstrates a single calibration with and without noise, showing log of central image intensity vs. source offset (c=0.3 meter(m)^(-1), g=0.55). The noise was modeled as photon noise with an STD of 1% of signal intensity. This is a relatively high noise level, but still it yields less than a 3% error. The image on the top right depicts the dependency of the accuracy on the number of images used (each one is taken at a different offset). For each test, 500 simulations of attenuation extraction were performed. More images or a higher turbidity yield a smaller error. However, the marginal contribution of each additional image decreases. The advantage of the TL technique is that as the turbidity increases, less images are needed for color calibration. This is in contrast to object-based methods that suffer SNR loss in higher turbidity.

The graph on the bottom left depicts the minimal source offset needed in order to get a 1% difference in central pixel intensity between two images, as a function of c. The higher the attenuation, the smaller offset is needed, but even in low attenuation less than 10 centimeters (cm) are needed, which makes the method very feasible to implement, e.g., by mounting two strobes in slightly different positions. The graph on the bottom right shows that after estimating attenuation, the TL technique yields the expected value (g=0.5) in both clean and 1% photonic noisy cases.

Once c is calibrated, a calibration image may be used in order to estimate the scattering parameters. Plugging EQN 6 into EQN 5 yields $$B_\infty = G \int_0^\infty Q \frac{e^{-c \cdot (R_S + R_{cam})} \cdot (1-g)}{R_S^2 \cdot (1 + g^2 - 2g\cos\Psi)} dX', \quad \text{(EQN 13)}$$

where the gain denoted G is defined as $G = I_S \beta_{HG}$.

In EQN 13 there are two unknown medium parameters left after c is estimated: G, and g. The following optimization may solve this:

$$(\tilde{g}, \tilde{G}) = \min_{g \in \Omega_g} \min_{G \in \Omega_G} [E(B_\infty^{measured}, B_\infty^{simulated})], \quad \text{(EQN 14)}$$

where E denotes an error measure, $\Omega_G$ denotes the range of possible gain values and $\Omega_g = (0, \ldots, 1)$. This may be solved separately for each color channel. Theoretically, c may be solved for in the same optimization, but simulations and experiments have shown that when c is unknown, EQN 14 does not have a single global minimum (i.e., may have multiple minima).

To speed up the minimization of EQN 14 and make it more robust to noise, a symmetric $B_\infty$ image may be used for calibration, and the symmetry exploited. For example, the backscatter image in FIG. 9 was taken with the source located at X=0, pointing parallel to the optical axis, such that the resulting backscatter image is symmetric along the y axis (i.e., the light source is above or below the camera). For example, the image is acquired with the light source above the camera, and the image depicts a scattering symmetry.

A vector may be constructed from the values along the symmetry axis of $B_\infty$(FIG>9) and solve EQN 14 for the vector, termed the backscatter center-line. For each value of $g \in \Omega_g$, the best fit $G \in \Omega_G$ is found in the $L_2$ sense. The final solution is the pair of g and G that yield the lowest error. A simulation of the error as a function of g is shown in FIG. 6. The minimum in both the clear and noisy image is the ground truth value in the simulation g=0.5.

Experimental Results

Reference is now made to FIG. 7A and FIG. 7B, which show first and second images of experimental results setup for target-less calibration in a turbid medium. An SLR camera housed in an underwater housing 704 with attached flash 702 was mounted on an aluminum frame 703. A rail 705 that may be moved parallel to the optical axis was attached to frame 703. The strobe 701 and object were later mounted on rail 705 for controlled-distance experiments. FIG. 7B shows an underwater view of the experimental results system. Light cone was clearly visible for estimating water properties.

Optionally, an actuator is configured to change the location and/or orientation of a light source, such as the strobe, illuminator, etc. That actuator may be one or more step motors, linear motors, etc., and include electronics for mechanically positioning the actuator according to digital coordinate values. For example, a two-dimensional robotic platform is used to move the strobe. For example, a directional light source is rotated to change the orientation of the light beam. For example, a light source is extended on a telescoping platform to change the location of the light beam.

Experiments were performed in real conditions at sea by scuba-diving. A Nikon D810 SLR camera was used, capable of acquiring raw linear images, with a 20 mm Nikon lens. The camera was housed in a Hugyfot housing with a dome port. Inon Z240 underwater strobes were used. The experimental frame was custom built using aluminum profiles (FIG. 7A). An underwater color-chart (DGK Color Tools) was used as a target object, attached to rail 705 so it moved along the optical axis, and stayed perpendicular to it, at distances of 70-140 cm. For the TL technique, the light source was placed on rail 705 to the side of the camera, allowing it to move horizontally, parallel to the optical axis (FIG. 7B), and in 5-cm steps. Tick marks were drawn on rail 705 to enable control of the source distance. Saturated backscatter images were acquired by pointing the setup to an area without any object. The focus and depth-of-field were set such that the entire backscatter was inside the depth-of-field for all distances. For the scattering calibration, the light source was attached to the camera housing using an off-the-shelf ball attachment. Note that standard off-the-shelf Xenon strobes were used and are known to have up to 5% fluctuations in intensity. To minimize this effect, acquisitions were acquired with several seconds between them to make sure the strobe was fully recharged.

Optionally, pre-calibrations are done underwater. Vignetting was calibrated in daylight by placing the camera on a tripod and capturing images of a white static calibration patch while rotating the camera between images. This calibration was not done underwater since a stable underwater light source was not available (non-strobe type). Camera intrinsic parameters were calibrated underwater with a checkerboard pattern using the camera calibration toolbox. Source angular distribution Q was calibrated in a water tank. A static camera pointing at a calibration target was used, while the light source was rotated. The light source was rotated both around its primary axis ($\hat{d}_s$), and its perpendicular direction (which modifies $\theta_s$). Results showed radial symmetry around the primary axis, and a cosine distribution around its perpendicular direction.

Reference is now made to FIG. 8, which shows images of attenuation estimation experimental results for target-less calibration in a turbid medium. The results from two experiments are shown in FIG. 8, one conducted at sea in clear water (CW) and one in turbid water (TW). The performance of the TL and OB techniques are compared under these different conditions.

Experimental results are shown using both methods in clear, top row, and turbid, bottom row, sea water experiments. The OB technique gave a stable result in clear water (narrow histogram), but lost stability in turbid water (OB technique was calculated using the white patch). The TL technique resulted in failures in clear water, however behaved as expected in turbid water (good linear fit, with acceptable outliers). All values are in inverse meter ($m^{-1}$ or m^(-1)) units. Results of attenuation calibration in the TW experiment were: $c_R$=0.62$m^{-1}$, $c_G$=0.56 $m^{-1}$, $c_B$=0.58 $m^{-1}$ using TL and $c_R$=0.69 $m^{-1}$, $c_G$=0.64 $m^{-1}$, $C_B$=0.67 $m^{-1}$ in OB. The red channel attenuation was stronger than the green and blue channels.

Reference is now made to FIG. 9, which shows images of scattering estimation experimental results for target-less calibration in a turbid medium. Top left image shows a backscatter calibration image ($B_\infty$) acquired. Note the in-homogeneous medium. Top right image shows a rendered $B_\infty$ using the calibrated attenuation and scattering parameters. Middle center image shows a relative difference image between the rendering and the input image (linear display). Bottom left graph shows the error of EQN. 14 as a function of g. The minimum is at g=0.55. Bottom right graph shows values at the backscatter center-line, calibration and reconstruction values.

Many points were sampled (m=26) along the backscatter center line, along the top 30% of this axis in the image, taking the median value of all pixels from a 100×100 square centered around each point. The reason for using only the top part of the image is that on the top part the image intensity is stronger, therefore less subject to noise.

Scattering calibration with the TW technique was done by using the same backscatter images acquired previously for the OB technique. FIG. 9 shows the measured signal (average of 5 images taken), next to the rendered backscatter image resulting from the calibrated parameters, along with an image showing the relative difference between the two. Numeric results were: $g_R=0.55$, $g_B=0.55$, $g_G=0.55$, $G_R=0.2$, $G_G=0.45$, $G_B=0.39$.

Calibration results were estimated by quantifying color consistency. For example, when estimated properties are correct, the colors of an object at various distances may all be corrected to the same value using EQN 7 regardless of the imaging distance in the medium. The values may be consistent with a free-space image of the same object taken with the same setup. The technique may be applied for recovering color-consistent underwater images that may be used for scientific applications, publicity, marketing, and/or the like.

Reference is now made to FIG. 10, which shows images of object reconstruction experimental results for target-less calibration in a turbid medium. Image at top left is an object image taken underwater at a distance of 140 cm from the camera. Image at bottom left is an object image in free space. Image at top right is a color corrected image of the underwater object using object based (OB) Method. Image at bottom right is a color corrected image using target-less (TL) method. All object images are gamma-corrected for display purposes. No de-noising was applied to the images.

For quantitative evaluation, the colors in linear RGB space were compared. Each color may be viewed as a vector in RGB space. The distance between two colors $A_1$ and $A_2$ was defined as the angle a between these vectors:

$$\cos\alpha = A_1 \cdot A_2 / (|A_1| \cdot |A_2|). \quad \text{(EQN 15)}$$

This measure ignores global image intensity which may not be recovered.

Results from several techniques were compared-TABLE 1 shows the groups. All results consist of two basic steps: backscatter removal, and attenuation compensation. Backscatter may be removed by at least two methods. In the first we subtract saturated backscatter, where we use an average of 5 backscatter images to reduce noise. In the second we calculate B using the known geometry and parameters estimated by the TL technique (c,g and G). Attenuation is compensated using EQN 7 with calibrated c either by TL or OB.

TABLE 1

Summary of Experimental Groups

| name | backscatter removal | attenuation correction |
|---|---|---|
| TL:a | none | TL result (c) |
| TL:b | TL result (g, G) | no |
| TL | TL result (g, G) | TL result (c) |
| TL:sat | saturated image subtraction | TL result (c) |
| OB | saturated image subtraction | OB result |

TABLE 2 presents a quantitative comparison of the error (α) between the free space image and correction of the furthest image (worst color deterioration). Five different embodiments were compared that differed in the backscatter removal method and attenuation compensation. The analysis was conducted on all patches of the color-target. Patches are numbered from left to right between 1-18, where 1 stands for the top-left white patch, 6 stands for the top right black patch, and so on (as seen in FIG. 3).

TABLE 2

A quantitative comparison of the error (α) between the free space image and correction of the furthest image (worst color deterioration), from the TW experiment.

| patch | raw | TL: a | TL: b | TL | TL: sat | OB |
|---|---|---|---|---|---|---|
| 1 | 2.9 | 1.5 | 3.6 | 1.8 | 1.9 | 1.8 |
| 2 | 2.6 | 1.3 | 3.5 | 1.7 | 2.3 | 2.1 |
| 3 | 2.8 | 1 | 3.5 | 1.6 | 1.8 | 2.3 |
| 4 | 2.7 | 0.8 | 3.6 | 1.8 | 1.9 | 2.5 |
| 5 | 2.1 | 0.9 | 3.9 | 3.7 | 3.9 | 4.3 |
| 6 | 2.8 | 1.2 | 5 | 5.5 | 10.1 | 9.4 |
| 7 | 21.1 | 18.1 | 12.9 | 9.1 | 6.5 | 7.6 |
| 8 | 9.9 | 9.9 | 5.3 | 4 | 3.1 | 3.5 |
| 9 | 5.3 | 7.7 | 1.8 | 4.6 | 4 | 3.4 |
| 10 | 8.3 | 8.2 | 5.8 | 5.0 | 4.5 | 4.2 |
| 11 | 3.9 | 2.3 | 2.7 | 1.9 | 4.3 | 4.5 |
| 12 | 20.1 | 16.9 | 14.2 | 11.0 | 9.1 | 10.0 |
| 13 | 11.0 | 7.9 | 6.3 | 5.3 | 10.4 | 9.4 |
| 14 | 12.0 | 9.7 | 7.4 | 3.7 | 3.7 | 4.3 |
| 15 | 6.4 | 7.0 | 6.2 | 6.4 | 6.5 | 6.0 |
| 16 | 9.3 | 6.2 | 6.4 | 3.1 | 2.2 | 2.9 |
| 17 | 5.1 | 3.2 | 3.9 | 1.6 | 1.5 | 1.8 |
| 18 | 5.4 | 3.4 | 4.6 | 1.5 | 3.7 | 3.2 |
| MEDIAN | 8.3 | 7.7 | 5.8 | 4 | 4 | 4.2 |

Figure 11:
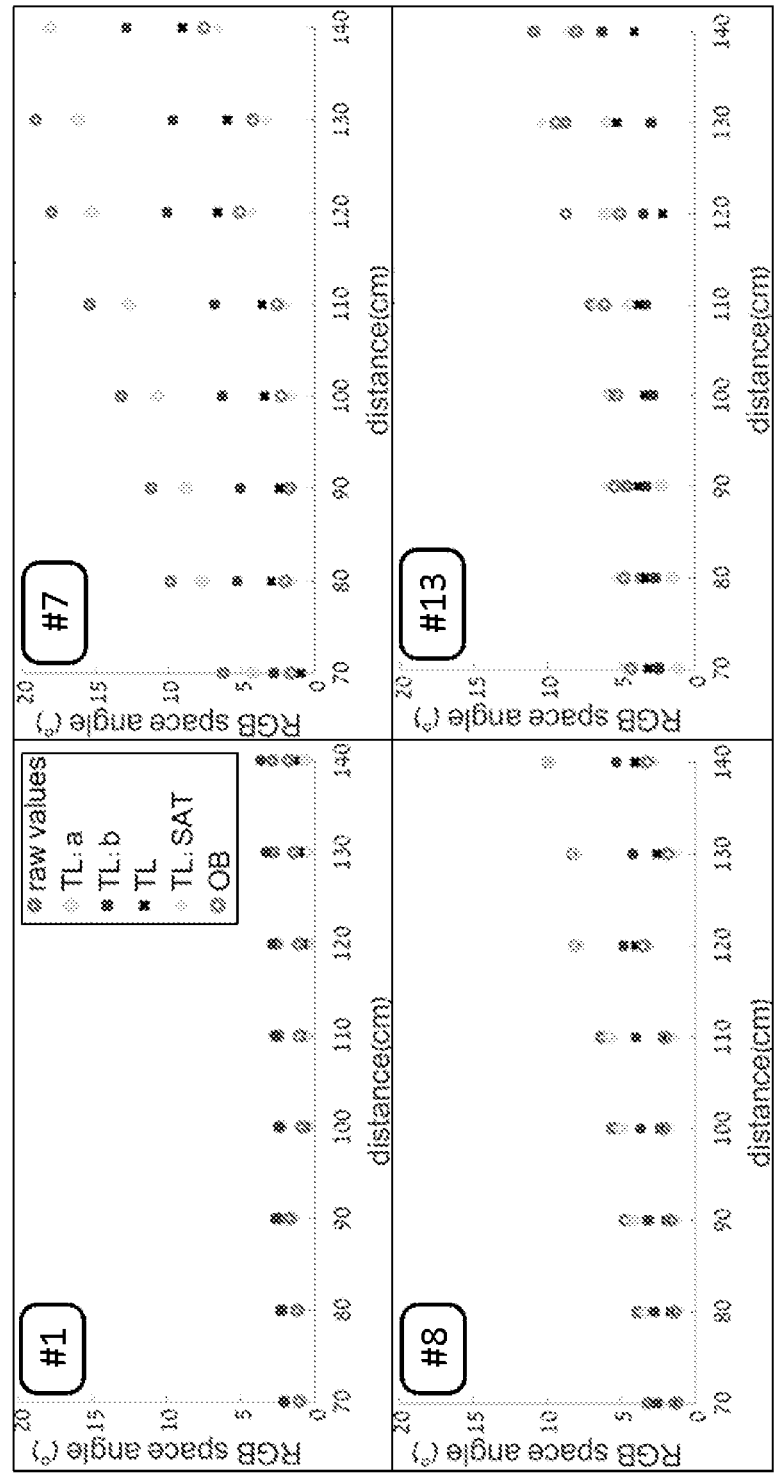
FIG. 11 shows images of color consistency experimental results of four patches for target-less calibration in a turbid medium.

The colors are visualized in FIG. 3, were the image depicts the colors of the raw patches. The deterioration of raw color with distance is clearly visible, and so is the effectiveness of the TL correction. Reference is now made to FIG. 11, which shows images of color consistency experimental results of four patches for target-less calibration in a turbid medium. The images depict the color consistency results of four selected patches in different colors (white, red, yellow, and brown) along all the tested distances. The different colors had different degradation, and both TL and OB techniques improved color consistency.

Looking at the median values, the attenuation coefficients from TL technique performed slightly better than OB. Note that OB was implemented in favorable conditions, where the registration between images was done manually. In practice, doing it automatically may be difficult. For backscatter removal, using g (TL) or saturated backscatter (TL:sat) showed similar median performance, but the performance was not consistent and changed significantly between patches. Some TL embodiments achieved half the error of TL:sat and some embodiments the opposite. This may be due to real-environment outliers such as particles in both the calibration and observed images. TL:sat was faster to implement, however using g may have added an insight on the medium itself and might have been more accurate in very close distances.

Overall, TL, TL:sat and OB exhibited comparable performance, and all three methods significantly improved the color consistency. The differences between them might reflect limits of reconstruction accuracy that was possible to achieve with a single attenuation coefficient per color channel. The raw error varied significantly between the patches, up to 10-fold. The color of the backscatter was approximately white, so it seems the white and gray patches may not have changed their color, although it may have come from the backscatter and not from the patch itself. Patches that had a high red value had the highest raw error, and the TL technique had the highest influence on results.

Figure 12:
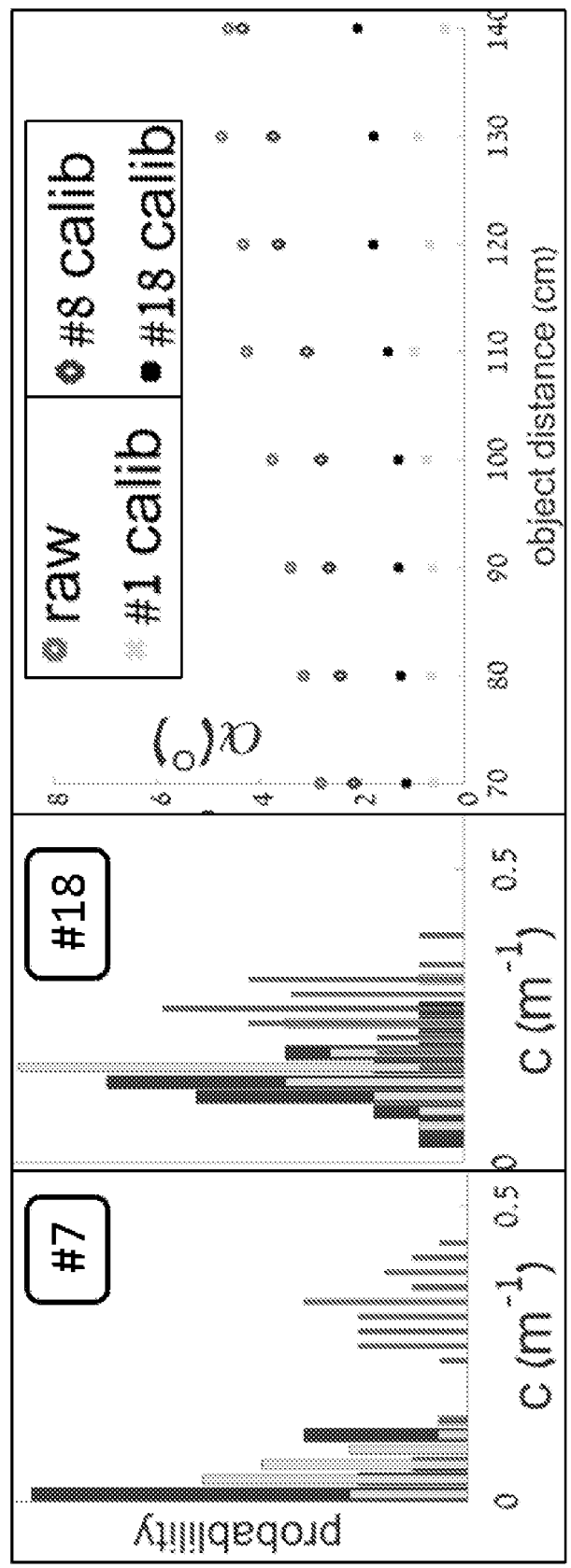
FIG. 12 shows images of clear water accuracy experimental results for target-less calibration in a turbid medium.

Reference is now made to FIG. 12, which images of clear water accuracy experimental results for target-less calibration in a turbid medium. The image at left-center shows attenuation calibration using OB technique on two different patches (#7, #18) with result of different attenuation values. Right image shows that color consistency analysis using different parameters gives different results. Best results were achieved when calibration was done on the object of interest itself, but this requires re-calibration for every object. The calibrated values using the OB technique differed when the embodiment of EQN 8 was applied on different patches, even in the clear water experiment. Differences of calibrated c from several patches are depicted in FIG. 12, together with the reconstruction errors. Different reflectance may have interacted differently with the wavelength-dependent attenuation. This suggests limits to reconstruction when using a global value for c.

Figure 13A:
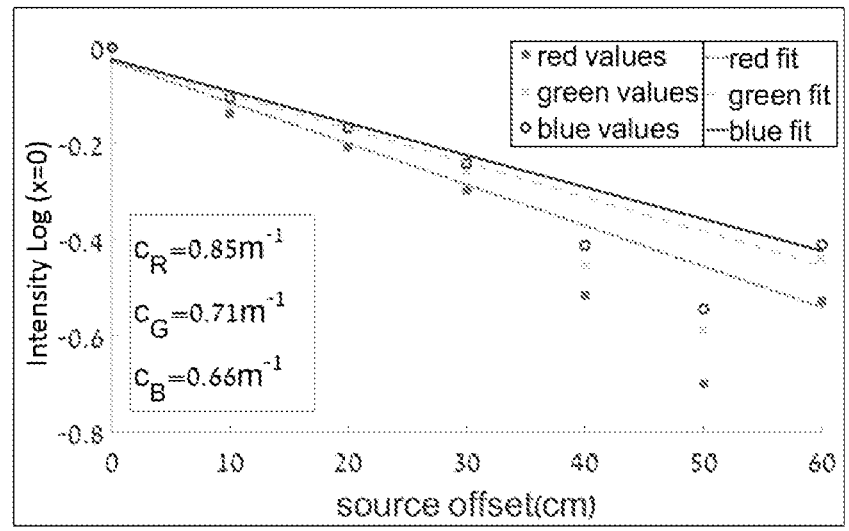
FIG. 13A shows a graph of a TL attenuation example from a first additional experiment for target-less calibration in a turbid medium.
Figure 13B:
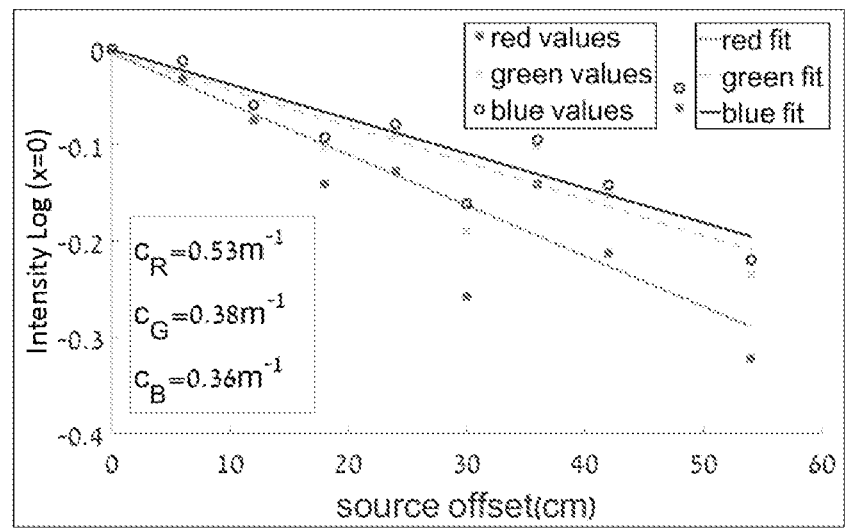
FIG. 13B shows a graph of a TL attenuation example from a second additional experiment for target-less calibration in a turbid medium.

Reference is now made to FIG. 13A and FIG. 13B, which show graphs of a TL attenuation example from a first and second additional experiment for target-less calibration in a turbid medium. TL attenuation calibration were conducted at sea in turbid water. There was a linear relationship between the log of intensity at central image area and the source offset. Red attenuation values were stronger than the other channels. Outlier rejection was done as explained above.

The equations and embodiments disclosed herein allow color calibration for underwater images, from digital images. When the medium is not completely homogeneous and is difficult to work in, embodiments disclosed herein use backscatter images taken in the medium for calibration, with the same hardware components that are used for the imaging itself (i.e., without requiring external color-charts or hardware).

From the experimental results, in low-turbidity the SNR in the backscatter images is sometimes too low for the calibration to work. Thus, the techniques may be less useful in some situations. However, in low turbidity the TL technique is optional. As shown in the results, the TL technique has advantages in high-turbidity situations as it utilizes the turbidity itself.

The TL technique may be applied in real-time, automatically, and the setup may be especially useful in autonomous vehicles such as cars and boats imaging dynamic scenes in low visibility conditions (fog, sand-storms, etc.). The TL technique may provide estimating visibility limits in autonomous systems, for example, autonomous decision on maximum safe driving speed in bad weather, and/or the like.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A calibration method comprising:
    acquiring a first image of a scene inside a medium, when there is no object along the line- of-sight (LOS), under illumination from a first location or orientation;
    acquiring a second image of the scene inside the medium, when there is no object along the LOS, under illumination from a second, different location or orientation; and
    computing attenuation coefficients, one per color channel, based on backscatter in the first and second images,
    wherein said calibration method does not require calibration based on detecting, in said first and second images, a known object in said scene.

2. The calibration method according to claim 1, further comprising: (a) estimating scattering parameters of the first image, the second image, or a third image of the scene, based on the computed attenuation coefficients; and constructing a color-corrected image of the scene based on the scattering parameters and the attenuation coefficients.

3. The calibration method according to claim 1, further comprising accelerating the estimation of scattering parameters, by:
    the first and second illumination locations or orientations being both along an optical axis of a camera used to acquire the first and second images, such that backscatter appearing in the first and second images is symmetrical.

4. The calibration method according to claim 1, wherein the medium is water or turbid water.

5. A camera comprising:
    an image sensor;
    an illuminator;
    an actuator configured to change at least one of a location and an orientation of said illuminator; and
    a hardware processor operatively coupled with said image sensor, illuminator, and actuator, and being configured to:
    acquire a first image of a scene inside a medium, when there is no object along the line-of-sight (LOS), under illumination from a first location or orientation,
    (ii) acquire a second image of the scene inside the medium, when there is no object along the LOS, under illumination from a second, different location or orientation, and
    (iii) compute attenuation coefficients, one per color channel, based on backscatter in the first and second images,
    wherein:
        (a) the first and second images are acquired by said image sensor,
        (b) the illumination is provided by said illuminator,
        (c) the illumination from the first and second locations is by changing at least one of the location and the orientation of said illuminator, and
        (d) said computing does not require calibration based on detecting, in said first and second images, a known object in said scene.

6. The camera according to claim 5, wherein the hardware processor is further configured to estimate scattering parameters of the first image, the second image, or a third image of the scene, based on the computed attenuation coefficients.

7. The camera according to claim 5, wherein the hardware processor is further configured to construct a color-corrected image of the scene based on the scattering parameters and the attenuation coefficients.

8. The camera according to claim 5, wherein the hardware processor is further configured to accelerate the estimation of scattering parameters, by:
    the first and second illumination locations or orientations being both along an optical axis of a camera used to acquire the first and second images, such that backscatter appearing in the first and second images is symmetrical.

9. The camera according to claim 5, wherein the medium is water.

10. The camera according to claim 5, wherein the medium is turbid water.

11. A camera comprising:
an image sensor;
at least two illuminators; and
a processor operatively coupled with said image sensor, illuminators, and actuator, and being configured to:
(i) acquire a first image of a scene inside a medium, when there is no object along the line-of-sight (LOS), under illumination from a first location or orientation,
(ii) acquire a second image of the scene inside the medium, when there is no object along the LOS, under illumination from a second, different location or orientation, and
(iii) compute attenuation coefficients, one per color channel, based on backscatter in the first and second images,
wherein:
(a) the first and second images are acquired by said image sensor,
(b) the illumination from the first location or orientation is provided by a first one of said illuminators,
(c) the illumination from the second location or orientation is provided by a second one of said illuminators, and
(d) said computing does not require calibration based on detecting, in said first and second images, a known object in said scene.

12. The camera according to claim 11, wherein the hardware processor is further configured to estimate scattering parameters of the first image, the second image, or a third image of the scene, based on the computed attenuation coefficients.

13. The camera according to claim 11, wherein the hardware processor is further configured to construct a color-corrected image of the scene based on the scattering parameters and the attenuation coefficients.

14. The camera according to claim 11, wherein the hardware processor is further configured to accelerate the estimation of scattering parameters, by:
the first and second illumination locations or orientations being both along an optical axis of a camera used to acquire the first and second images, such that backscatter appearing in the first and second images is symmetrical.

15. The camera according to claim 11, wherein the medium is water.

16. The camera according to claim 11, wherein the medium is turbid water.

17. The camera according to claim 5, wherein the at least one hardware processor is further configured to correct for vignetting at least one of the first image, the second image, and the third image.

18. The camera according to claim 11, wherein the at least one hardware processor is further configured to correct for vignetting at least one of the first image, the second image, and the third image.

19. A submersible vehicle comprising the camera of claim 5.

20. A submersible vehicle comprising the camera of claim 11.

* * * * *